(12) United States Patent
Urdang et al.

(10) Patent No.: US 7,890,988 B2
(45) Date of Patent: *Feb. 15, 2011

(54) TECHNIQUE FOR DELIVERING ENTERTAINMENT PROGRAMMING CONTENT INCLUDING INTERACTIVE FEATURES IN A COMMUNICATIONS NETWORK

(75) Inventors: Erik G. Urdang, Boulder, CO (US);
David M. Kimble, Escondido, CA (US);
Joseph Buehl, Studio City, CA (US);
Darryl L. DeFreese, Lawrenceville, GA (US)

(73) Assignee: TWC Interactive Video Group, Inc., Stamford, CT (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/514,672

(22) Filed: Sep. 1, 2006

(65) Prior Publication Data

US 2007/0083902 A1      Apr. 12, 2007

Related U.S. Application Data

(63) Continuation of application No. 10/175,475, filed on Jun. 19, 2002, now Pat. No. 7,111,314.

(60) Provisional application No. 60/377,963, filed on May 3, 2002.

(51) Int. Cl.
*H04N 7/10* (2006.01)
*H04N 7/08* (2006.01)

(52) U.S. Cl. .......................... 725/116; 725/36; 725/112
(58) Field of Classification Search ................. 725/112, 725/116, 32, 34, 37–43, 50–52, 60, 61, 105, 725/109, 110, 114, 36
See application file for complete search history.

(56) References Cited

U.S. PATENT DOCUMENTS

| | | | | |
|---|---|---|---|---|
| 5,929,849 A | * | 7/1999 | Kikinis | 725/113 |
| 6,006,256 A | * | 12/1999 | Zdepski et al. | 725/114 |
| 6,342,926 B1 | * | 1/2002 | Hanafee et al. | 348/563 |
| 6,594,798 B1 | * | 7/2003 | Chou et al. | 714/820 |
| 6,725,267 B1 | * | 4/2004 | Hoang | 709/226 |
| 7,020,888 B2 | * | 3/2006 | Reynolds et al. | 725/34 |
| 7,584,491 B2 | * | 9/2009 | Bruckner et al. | 725/36 |

* cited by examiner

*Primary Examiner*—Andrew Y Koenig
*Assistant Examiner*—Jason Thomas
(74) *Attorney, Agent, or Firm*—Straub & Pokotylo; Michael P. Straub

(57) ABSTRACT

In delivering an entertainment program over a communications network, e.g., a cable TV network, interactive application data for realizing interactive features in the entertainment program are interjected into the program stream carrying the entertainment program on an as needed basis. Because the entire channel bandwidth is temporarily dedicated for transmission of the interactive application data, whose amount is relatively small compared with that of the video and audio data of the programming content, the interactive application data when transmitted appears as a short "burst," causing a virtually unnoticeable interruption in the programming content delivery.

21 Claims, 7 Drawing Sheets

400

| | | | ORDER | |
|---|---|---|---|---|
| | NY GIANTS TEAM JERSEY | LARGE | 2345 | <SELECT> |
| NY | NY GIANTS TEAM JERSEY | MEDIUM | 2346 | <SELECT> |
| | NY GIANTS TEAM JERSEY | SMALL | 2347 | <SELECT> |

TECHNIQUE FOR DELIVERING ENTERTAINMENT PROGRAMMING CONTENT INCLUDING INTERACTIVE FEATURES IN A COMMUNICATIONS NETWORK

RELATED APPLICATION

The present application is a continuation of U.S. patent application Ser. No. 10/175,475 filed on Jun. 19, 2002 which issued as U.S. Pat. No. 7,111,314 and which claims the benefit of U.S. Provisional Patent Application Ser. No. 60/377,963 filed on May 3, 2002.

FIELD OF THE INVENTION

The invention relates to communications systems and methods, and more particularly to a system and method for delivering entertainment programs and information through a communications network, e.g., a cable TV network.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single transmission channel. A digital TV receiver may be used to decode an MPEG-2 encoded transport stream, and extract the desired program therefrom.

MPEG-2 BACKGROUND

In accordance with the MPEG-2 standard, video data is compressed based on a sequence of groups of pictures (GOPs), in which each GOP begins with an intra-coded picture frame (also known as an "I-frame"), which is obtained by spatially compressing a complete picture using discrete cosine transform (DCT). As a result, if an error or a channel switch occurs, it is possible to resume correct decoding at the next I-frame.

The GOP may represent up to 15 additional frames by providing a much smaller block of digital data that indicates how small portions of the I-frame, referred to as macroblocks, move over time. Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 metadata describing the transport stream. The MPEG-2 metadata includes a program associated table (PAT) that lists every program in the transport stream. Each entry in the PAT points to a program map table (PMT) that lists the elementary streams making up each program. Some programs are open, but some programs may be subject to conditional access (encryption) and this information is also carried in the MPEG-2 metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counts are implemented to ensure that every packet that is needed to decode a stream is received.

Nowadays, some of the entertainment programs delivered by a cable TV network include interactive features, which often relate to the programming content that is being shown to a user. For example, an "INFO" icon may appear on the TV screen while a regional football game is being shown, a selection of which by a remote control results in a display of scores of other regional football games being played. A similar icon may appear on the TV screen while a commercial is being shown, a selection of which results in a display of information concerning, e.g., the specification of the product or service being promoted in the commercial. To ensure a timely presentation of an interactive feature, the corresponding interactive application data may be received and stored in the user's set-top box in advance of its presentation.

In prior art, the interactive application data is transmitted to a set-top box by time-division multiplexing the data with a transport stream. In a well known manner, periodic time slots are allocated for transmission of the interactive application data while the remaining time slots are allocated for transmission of the transport stream through the same transmission channel. The periodicity of the time slots for interactive application data is pre-selected, which corresponds to an anticipated frequency of interactive features in the broadcast entertainment programs. However, because not every broadcast entertainment program contains an interactive feature(s), the actual rate of interactive features is typically lower than the anticipated frequency, which is generously estimated erring on the cautious side of overestimating the actual interactive feature rate. As a result, some, if not most, of the periodic time slots are typically unused by the interactive application data and thus wasted. The wasted time slots represent an ineffective utilization of the bandwidth of the transmission channel.

To more effectively utilize the transmission channel bandwidth, out-of-band transmission of interactive application data has been proposed, which requires that the interactive application data be transmitted through a different channel or broadcast mechanism than that of the transport stream. However, this approach is not cost-effective as it normally calls for additional communication facilities, including an elaborate arrangement for synchronizing the transmissions of the interactive application data and the corresponding transport stream through different channels or broadcast mechanisms.

SUMMARY OF THE INVENTION

The invention overcomes the prior art limitations by interjecting, on an as needed basis, interactive application data into a data stream which includes program data representing an entertainment program with which the interactive application data is associated. In accordance with the invention, no predetermined bandwidth of the transmission channel through which the data stream is transmitted is required for transmission of the interactive application data. Rather, the transmission channel bandwidth is dynamically allocated for transmission of the interactive application data after it is determined that the entertainment program has interactive application data associated therewith. The transmission of the interactive application data occurs prior to transmission of a portion of the program data, corresponding to a part of the entertainment program before an interactive feature in the entertainment program is realized based on the interactive application data. Because, e.g., the entire transmission channel bandwidth is temporarily dedicated to the interactive application data when transmitted, the data whose amount is relatively small, compared with that of the data stream, appears as a short burst(s) punctuating the data stream, thus causing virtually an unnoticeable interruption(s) in the entertainment program delivery.

In a preferred embodiment, the interactive application data is transmitted at a natural program break point (e.g., at the transition from one entertainment show to another, or from an entertainment show segment to a commercial and vice versa) to avoid any undesirable program interruption, which for the reasons stated above should be virtually unnoticeable to the user anyway, and which in the preferred embodiment is further "camouflaged" at one such natural break point.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

The invention is directed to delivering programming content, sometimes containing interactive features, to a user through a broadband communications network, e.g., a cable TV network. In accordance with the invention, interactive application data for realizing the interactive features is introduced, on an as needed basis, to the transmission channel through which a transport stream carrying the programming content is transmitted. The interactive application data, when needed, is transmitted in bursts, which are interspersed with MPEG-2 video and audio data in the transport stream. Because the entire transmission channel bandwidth is temporarily dedicated to the interactive application data when transmitted, the data whose amount is relatively small, compared with that of the transport stream, appears as short bursts punctuating the transport stream, thus causing virtually unnoticeable interruptions in the programming content delivery.

In a preferred embodiment, the interactive application data for realizing an interactive feature is transmitted, e.g., to a user's set-top terminal in its entirety and stored there before transmission of the program segment with which the interactive feature is associated. The set-top terminal then processes the data, and presents the interactive feature at an appropriate time (which may be specified in the data) during the showing of the associated program segment.

Figure 1:
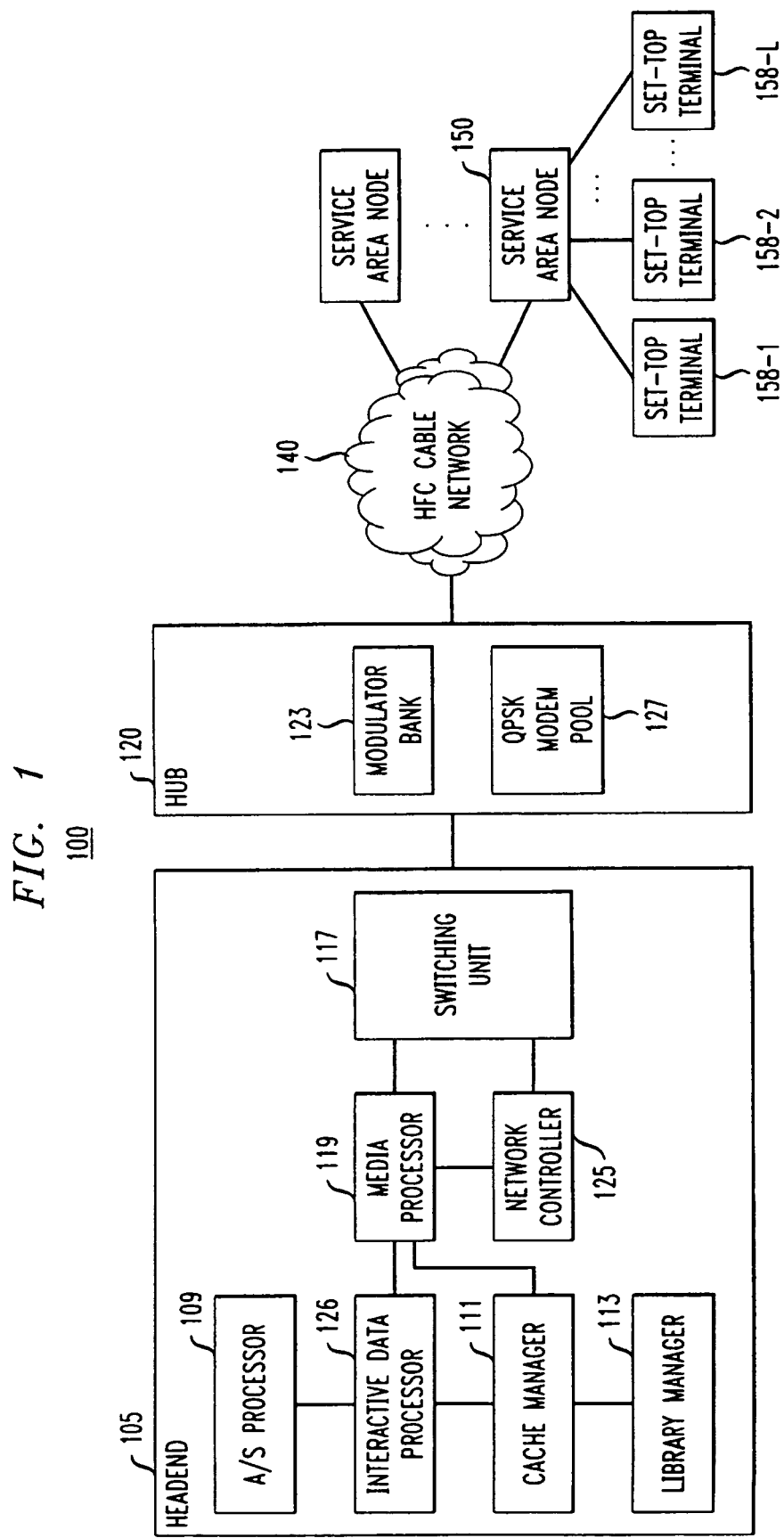
FIG. 1 is a block diagram of a broadband communications system in accordance with the invention.

FIG. 1 illustrates broadband communications system 100 embodying the principles of the invention for providing users with information and programming content, sometimes containing interactive features. For example, system 100 in this instance includes a cable system for delivering information and entertainment programs to set-top terminals on the user premises. As shown in FIG. 1, system 100 includes headend 105, hub 120, hybrid fiber coax (HFC) cable network 140 and different service area nodes including node 150, which in this instance is connected to set-top terminals 158-1 through 158-L in a neighborhood, where L represents an integer.

Headend 105 receives programs, services and interactive content from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. The media servers also provide data relating to interactive content that is associated with programs and services transmitted by headend 105. Such data relating to, e.g., the appearance of a link to the interactive content (e.g., a prompt, an icon, etc.) to be displayed, when the link should be displayed, the content of the link (text, graphics, etc.), what happens when a user accesses the link, etc.

Acquisition/Staging (A/S) processor 109 in headend 105 processes program materials including, e.g., TV program streams, from one or more of the aforementioned sources in analog and digital forms. Analog TV program streams may be formatted according to the National Television Standards Committee (NTSC) or PAL broadcast standard. Digital TV streams may be formatted according to the Digital Satellite System (DSS), Digital Broadcast Services (DBS), or Advanced Television Standards Committee (ATSC) standard. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from headend 105 to a set-top terminal.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container for any object or set of objects that may be desired to implement non-interactive aspects of a program or service, including video, audio, images, application executables, scripts, configuration files, text, fonts, and HTML pages. In addition to the raw content, metadata (not to be confused with MPEG-2 metadata) is also a part of an asset object that describes characteristics of the asset. For example, asset metadata may describe attributes that are inherent in the content of the asset, such as the format, duration, size, or encoding method. Values for asset metadata are determined at the time the asset is created.

In this illustrative embodiment, an asset concerning a program includes a metadata file and trick files associated with the program, in addition to the program content contained in a transport stream. The make-up of the trick files are fully described below. It suffices to know for now that the trick files are used in headend 105 to perform such personal-video-recorder- (PVR-) like functions as rewinding and fast-forwarding of the program while it is being viewed.

Interactive data processor 126 in headend 105 receives interactive application data for realizing interactive features (e.g., from the aforementioned media servers, content providers or other sources) to be presented during showing of programming content (e.g., TV shows and commercials). An interactive feature may be presented with a visual link (e.g., a prompt, an icon, etc.) during a TV show or commercial. For example, a selection of the visual link by, say, pressing a designated button on a remote control, causes an activity associated with the interactive feature to occur.

Figure 2:
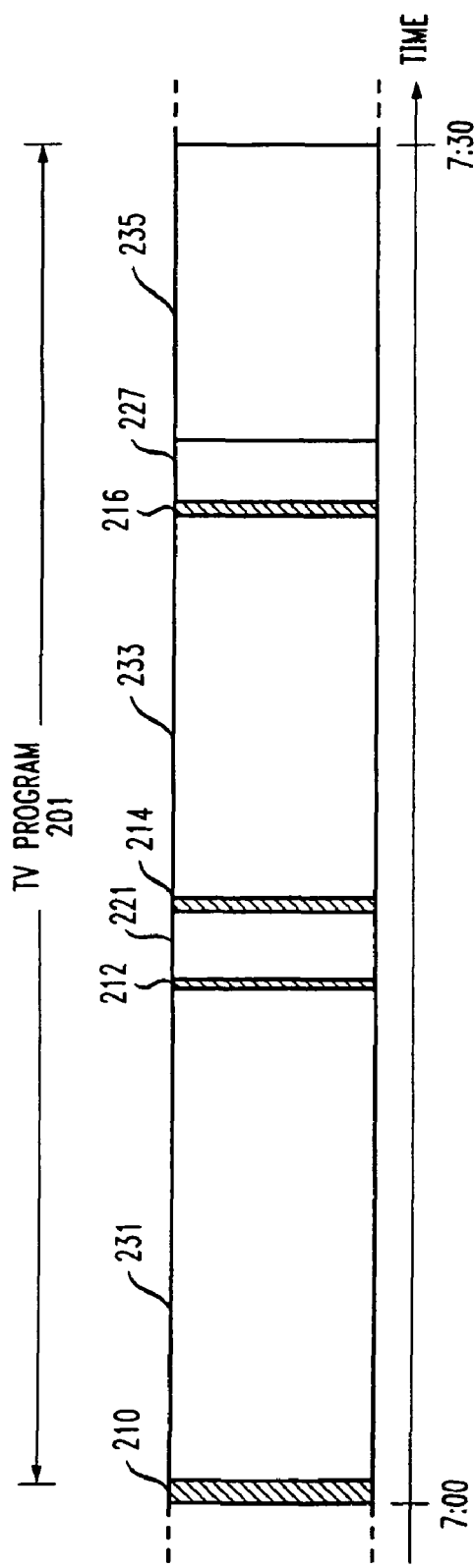
FIG. 2 is a timing diagram illustrating the time sequence of transmissions of program segments and interaction application data for realizing interactive features in the program segments, in accordance with the invention.

FIG. 2 illustrates a time sequence of delivering, through a transmission channel, TV program 201 and interactive application data for realizing interactive features in program 201. Program 201, which spans from 7:00 p.m. to 7:30 p.m., comprises a show interrupted by commercials, which is typical. Thus, the program content in this instance consists of show segments 231, 233 and 235, interleaved with commercial segments 221 and 227, all of which are MPEG-2 encoded. In addition, two of the show segments (231, 233) and both of the commercial segments (221, 227) have interactive features associated therewith. In accordance with the invention, no transmission channel capacity is reserved for communication of an interactive feature. Rather, once it is determined that a program segment has an interactive feature associated therewith, the data needed for realizing the interactive feature is interjected into the program stream for transmission before the portion of the program stream corresponding to the associated program segment is transmitted. Because the amount of data that is needed to provide an interactive feature is usually small, e.g., 1 to 50 kilobytes, compared with that of video/audio program content data which is on the order of megabytes, and because the entire transmission channel bandwidth is temporarily dedicated for transmission of the interactive application data, the delay in transmitting a program segment due to transmission of the associated interactive application data, in most instances, is unnoticeable to the user.

Thus, as shown in FIG. 2, the data for realizing a first interactive feature associated with show segment 231 is transmitted ahead thereof and appears as short burst 210; the data for realizing a second interactive feature associated with commercial segment 221 is transmitted ahead thereof and appears as short burst 212; the data for realizing a third interactive feature associated with show segment 233 is transmitted ahead thereof and appears as short burst 214; and the data for realizing a fourth interactive feature associated with commercial segment 227 is transmitted ahead thereof and appears as short burst 216.

In this preferred embodiment, the interactive application data is transmitted during a period in which a user normally expects some delay in program transmission. For example, in most cases, a blank screen appears in between the display of a show segment and a commercial segment, two successive shows, or two successive commercials. Accordingly, by transmitting the interactive application data associated with a program segment where a blank screen is expected, an additional, short delay in receiving the program segment resulting from the interactive application data transmission would go unnoticed by the user.

In accordance with an aspect of the invention, the TV program streams received by processor 109 are pre-processed, e.g., by the providers, to include indicators, e.g., cue-tones, on which processor 109 relies to identify the demarcations (or edges) of different programs and program segments within each program. As described more fully below, interactive data processor 126 relies on such cue-tones to determine where the interactive application data associated with a program segment is inserted in accordance with the preferred embodiment. Thus, for example, before processor 109 processes the program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201.

It should be noted that where program 201 is not an initial broadcast program, which may be pre-staged, commercial segments 221 and 227 may not contain the commercials originally provided by the program provider. Rather, program 201 may be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

Figure 3:
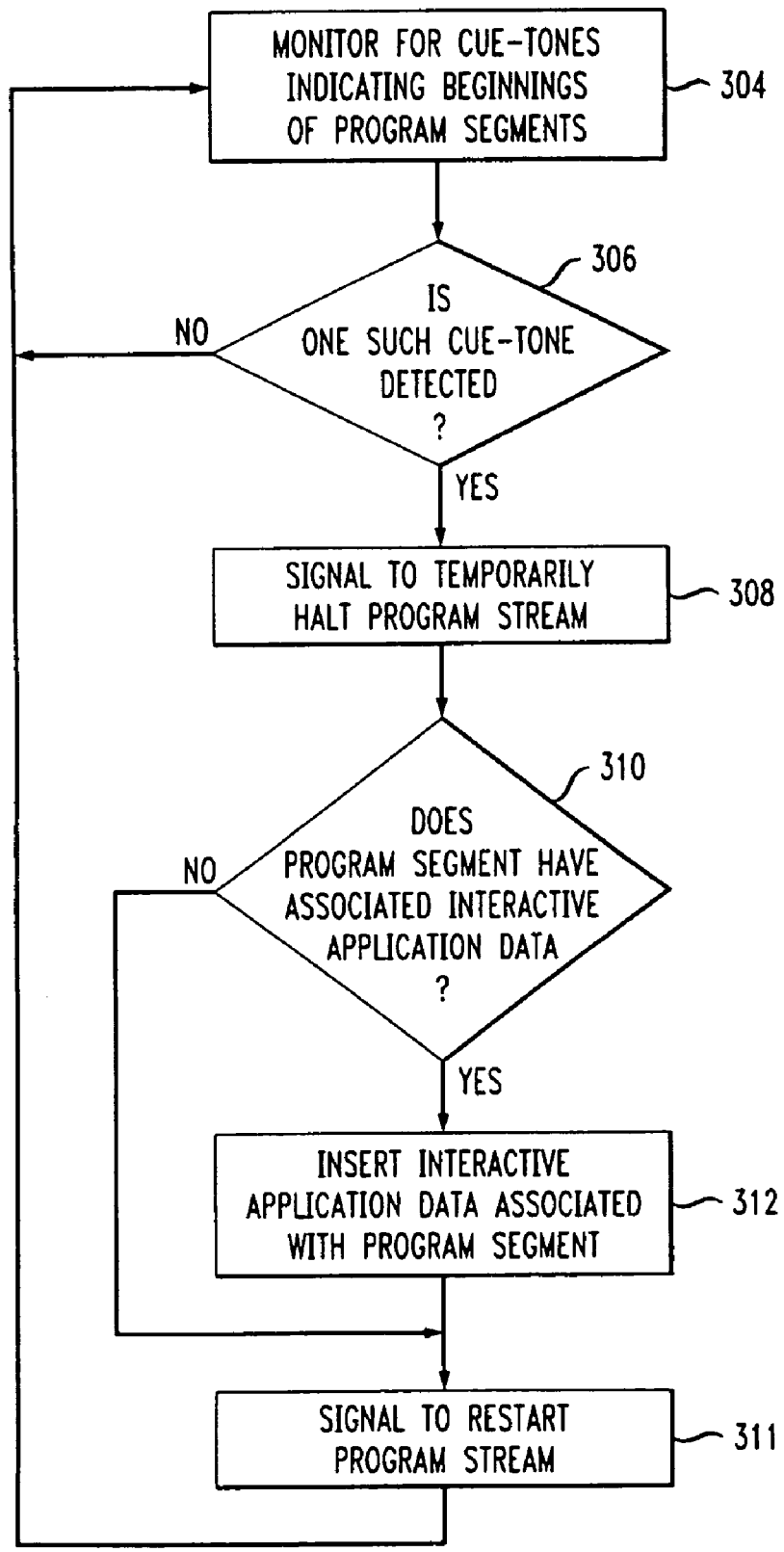
FIG. 3 is a flow chart depicting a process for incorporating interactive application data into a program stream containing programming content in accordance with the invention.

In realizing interactive features in the associated program segments, the transport streams generated by processor 109, which contain program streams representing TV programs including program 201 in this instance, are fed to cache manager 111 through interactive data processor 126. FIG. 3 illustrates a process run by interactive data processor 126 to incorporate interactive application data in a program stream containing, e.g., program 201 in accordance with the preferred embodiment. Processor 126 monitors for those cue-tones in each program stream which indicate the beginnings of program segments (steps 304, 306). If one such cue-tone is detected, processor 126 signals to A/S processor 109 to temporarily halt the program stream feed (step 308). Processor 126 determines whether the program segment preceded by the cue-tone has any associated interactive application data for realizing one or more interactive features (step 310). If no such data exists, processor 126 signals to A/S processor 109 to restart the program stream feed (step 311). If, however, there is associated interactive application data, processor 126 inserts the interactive application data, delimited by a Data Start flag and a Data End flag, ahead of the program segment in question (step 312). The process then proceeds to step 311.

Processor 126 may also create in real time trick files associated with program 201 as part of the asset which are used to perform PVR-like functions (e.g., rewinding and fast-forwarding) on program 201. One such trick file in this instance is a "fast-forward" trick file which contains an array of identifiers of I-frames in the program stream (MPEG-2 encoded as mentioned before) corresponding to program 201 in a forward direction. Another trick file is a "rewind" trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

Cache manager 111 includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours' worth of the TV programs and associated interactive data while the library storage stores the last Z hours' worth of the TV program, where the value of Z is much greater than that of Y. It suffices to know for now that use of the cache memory, which affords faster access to its content than the library storage, facilitates a speedy retrieval of a requested program and associated interactive data in the event of a "cache hit," i.e., the requested program being within the last Y hour broadcast. Otherwise, a "cache miss" causes locating the requested program and associated interactive data in the library storage, thereby incurring a delay in the retrieval of the program.

Network controller 125, among others, assigns resources for transporting program materials and associated interactive application data to set-top terminals and communicates other data including system information with the terminals. Upstream data from a set-top terminal to network controller 125 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller may change after a system reconfiguration. Nevertheless, each set-top terminal and controller is also assigned a media access control (MAC) address on a permanent basis, surviving any system reconfiguration.

Downstream data from network controller 125 to a set-top terminal is communicated via forward data channels (FDCs). These channels, often referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or change from another channel to channel 2, terminal 158-1 in a well known manner scans for any transport streams transporting programs to the neighborhood. In system 100, each transport stream is identified by a unique transport stream identification (TSID).

Figure 4:
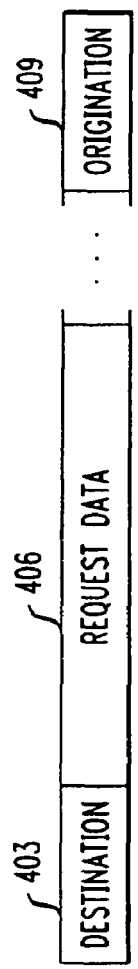
FIG. 4 illustrates a request for program material from a set-top terminal in the system of FIG. 1.

Continuing the above example, once the TSIDs of the transport streams are detected, terminal 158-1 sends through QPSK modem pool 127 a request for program channel 2 material. FIG. 4 illustrates one such request (denoted 400) sent from a set-top terminal to network controller 125 via an RDC. As shown in FIG. 4, request 400 includes, among others, destination field 403 which in this instance contains the IP address of network controller 125 for which request 400 is destined; request data field 406 which contains data concerning the detected TSIDs and the requested program channel material, e.g., program channel 2 material in this instance; and origination field 309 which in this instance contains the IP (and/or MAC) address of terminal 158-1 from which request 400 originates.

Figure 5:
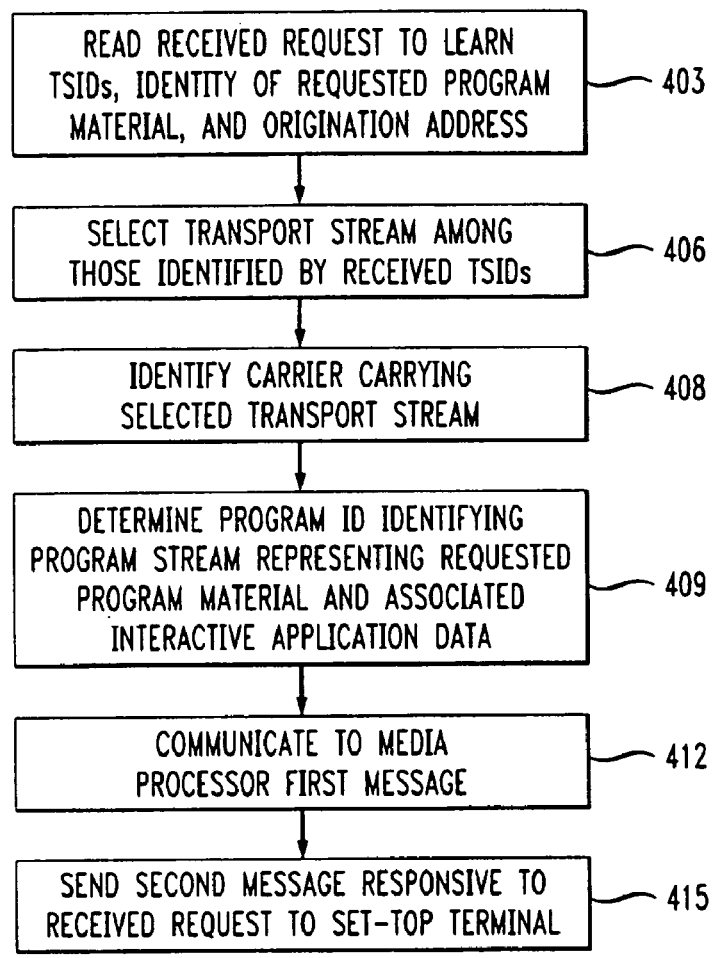
FIG. 5 is a flow chart depicting a process for providing program material including interactive application data in response to the request of FIG. 4.

After receiving request 400, network controller 125 reads the received request to learn the TSIDs, the identity of the requested program material, and the origination address therein, as indicated at step 503 in FIG. 5. Network controller 125 communicates with media processor 119 to determine the capacity required for transmitting the requested program material and any associated interactive application data. Based on the required capacity, controller 125 at step 506 selects a transport stream among those identified by the received TSIDs which is suitable for transporting the requested program material and associated interactive application data. Controller 125 at step 508 identifies the carrier carrying the selected transport stream and interactive application data.

Figure 6:
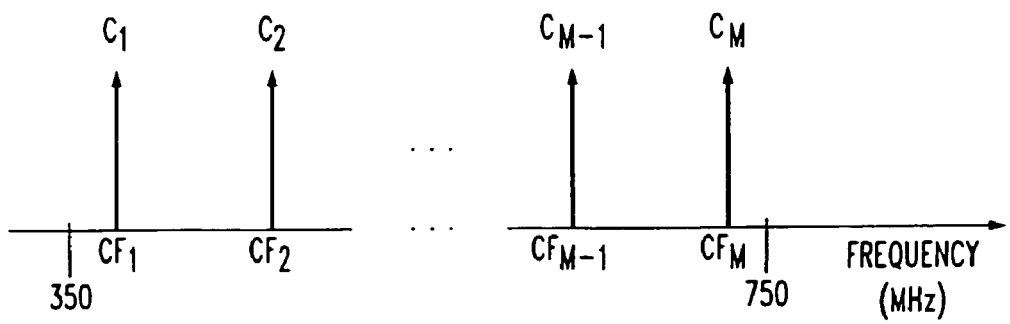
FIG. 6 illustrates selected carriers for transmitting program materials in a forward passband of the system of FIG. 1.

Referring also to FIG. 1, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 6 illustrates M carriers, $C_1$ through $C_M$, associated with M transmission channels in the forward passband. As shown in FIG. 6, the carrier frequency of $C_1$ is denoted $CF_1$; the carrier frequency of $C_2$ is denoted $CF_2$; . . . ; and the carrier frequency of $C_M$ is denoted $CF_M$. Each modulator in modulator bank 123 in this instance is used to modulate a transport stream, punctuated with bursts of interactive application data, onto the corresponding carrier. In this example, each program stream may contain 4.2 Mb/s video and audio program data. By using a 256-quadrature-amplitude-modulation (256-QAM) technique and 6 MHz transmission channel, The transport stream may contain up to 9 multiplexed program streams. The resulting modulated carrier is transmitted through the transmission channel associated with the carrier. As discussed above, the interactive application data is transmitted through the transmission channel utilizing the entire 6 MHz channel bandwidth in accordance with the invention.

Network controller 125 may include therein a carrier assignment table which lists, for each carrier, the TSID of the transport stream carried thereby. The carrier identification by network controller 125 at aforementioned step 508 may be achieved by looking up from the table the carrier associated with the TSID of the selected transport stream. Based on the requested program channel, network controller 125 at step 509 determines the program ID identifying the program stream representing the requested program material, i.e., program channel 2 material in this instance, and any associated interactive application data. The program stream is then multiplexed with other program streams in the selected transport stream. The transport stream is punctuated with the associated interactive application data in accordance with the timing diagram of FIG. 2. At step 512, network controller 125 communicates to media processor 119 a first message containing the identity of the modulator in modulator bank 123 which corresponds to the carrier, say, $C_1$, just determined, and the program ID associated with the requested program channel material just determined. Network controller 125 at step 515 sends, through QPSK modem pool 127, a second message responsive to the received request to set-top terminal 158-1 identified by the origination IP (and/or MAC) address in field 409 of request 400. This second message traversing an FDC contains the information concerning the carrier frequency, i.e., $CF_1$ in this instance, to which terminal 158-1 should tune to receive the appropriate transport stream punctuated with interactive application data, and the program ID for extracting the desired program stream, representing in this instance program channel 2 material, within the transport stream and any associated interactive application data.

In response to the first message, processor 119 directs cache manager 111 to deliver a copy of the program stream representing the requested program channel material, with any associated interactive application data inserted therein. Processor 119 causes the program stream to be multiplexed with any other program streams already in the transport stream identified by the selected TSID, and the associated interactive application data (enclosed by the aforementioned Data Start and Data End flags) to be inserted in the transport stream, maintaining the same order of the data with respect to the associated program segments as before. In addition, processor 119 causes switching unit 117 to switch the resulting transport stream, punctuated with the interactive application data, to the modulator corresponding to the carrier $C_1$. Accordingly, the modulator modulates the carrier $C_1$ with the received transport stream and interactive application data, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance, as well as any associated interactive data enclosed by the Data Start and Data End flags. In a well known manner, terminal 158-1 converts the extracted program stream to appropriate signals for the associated TV to play program channel 2 material. At the same time, the received interactive application data, which may comprise JAVA applets, files in extensible markup language (XML) or other proprietary code, is processed by terminal 158-1. Based on the received data, terminal 158-1 realizes one or more interactive features and is instructed to release such features at specified times, e.g., at certain points of the associated program segments, respectively. Of course, the time lapse from the receipt of interactive application data to the release of the corresponding interactive feature(s) should be great enough to allow sufficient time for terminal 158-1 to process the data. It should be noted that in an alternative embodiment, the interactive application data may not include the actual data for realizing the interactive feature, but a reference to the source of such data, e.g., in headend 105, from which a set-top terminal may obtain. In that embodiment, the set-top terminal processing time needed to realize an interactive feature should also include the time required for obtaining from the source the actual data for realizing the interactive feature.

Figures 7, 8:
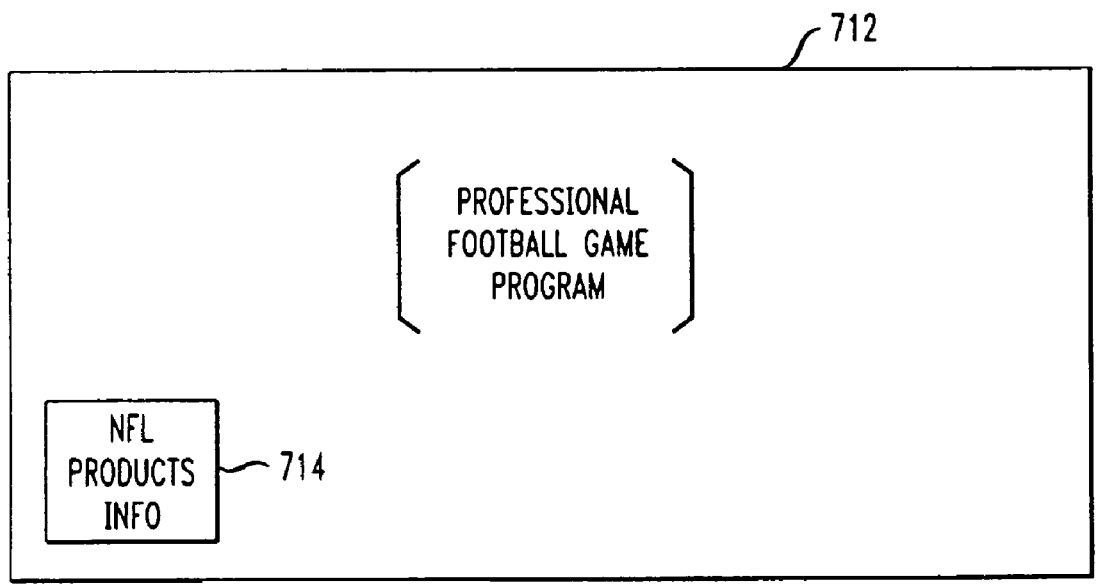
FIG. 7 illustrates a display of programming content including a link to interactive content in accordance with the invention.
FIG. 8 illustrates a display of the interactive content after a selection of the link.

FIG. 7 shows a display of a frame of an in-progress channel 2 program, e.g., a professional football game program, with an interactive feature associated therewith, on TV 712 connected to terminal 158-1. The presence of the interactive feature is indicated by link 714. In this instance, link 714 is in the form of an icon having thereon the text "NFL Products Info," informing the user that interactive content concerning National Football League (NFL) products, e.g., NFL team helmets, jackets, jerseys, etc. is available. A user may select link 714 through a user interface, such as a remote control, computer keyboard, etc., in communication with set-top terminal 158-1. In this instance, the user selects link 714 by pressing an "INFO" key on the remote control. In response to such a selection, terminal 158-1 retrieves from a memory therein the requested interactive content derived from the interactive application data received earlier, and causes the interactive content to be shown on TV 712.

FIG. 8 shows such interactive content, including a catalog of NFL products, e.g., New York Giants football team jerseys and their illustrations and prices. For each product, the user is prompted to enter a product code on the remote control to order the product. For example, by pressing, on the remote control, keys "2," "3," "4," and "5," which correspond to the product code of a size large New York Giants team jersey, followed by a "Select" key, the user in this instance orders one such jersey. After receiving the signals resulting from depression of the keys from the remote control, terminal 158-1 transmits the order, along with the IP (and/or MAC) address of the terminal, through an RDC to a transaction engine (not shown) in headend 105. The transaction engine then processes the order and causes the jersey as ordered sent to the user. The user's address is made available to the transaction engine which was provided by the user when he/she first established an account with the subject cable TV service. The user account may be cross-referenced by the transaction engine using the IP (and/or MAC) address of terminal 158-1 assigned to the user. The transaction engine may charge the order to the user account, and the resulting charges may be reflected on a periodic bill to the user. Alternatively, the transaction engine may charge the order to the user credit card account, debit card account, etc., if such card account information is on file or if the user, when ordering, enters such card information using the remote control.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the interactive application data and program being transmitted to terminal 158-1 and its I-frame progress. When processor 119 no longer receives heartbeats from terminal 158-1, e.g., because of an off state of the terminal, processor 119 may cause the transmission of the transport stream and interactive application data to terminal 158-1 to be halted.

Figure 9:
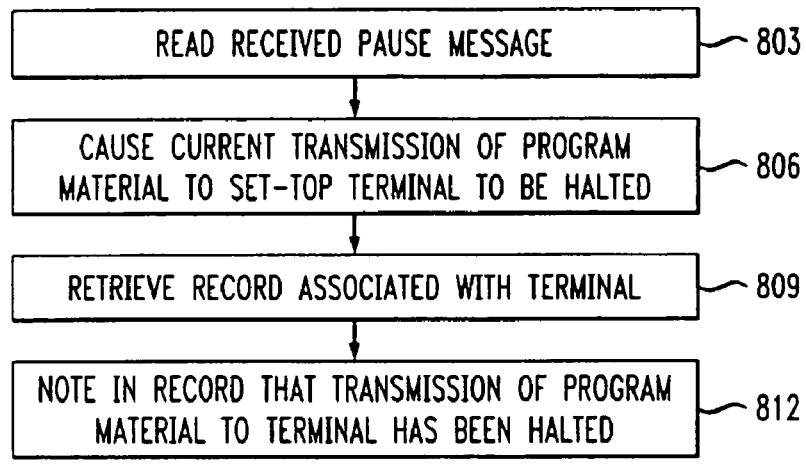
FIG. 9 is a flow chart depicting a process for pausing a program in response to a pause message from a set-top terminal.

When the user issues a pause command to terminal 158-1, e.g., by pressing a "pause" key on the remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. After receiving the pause message, processor 119 reads the received pause message, as indicated at step 803 in FIG. 9. Processor 119 at step 806 causes the current transmission of the program material including any interactive application data to set-top terminal 158-1 (identified by the received IP and/or MAC address) to be halted at the I-frame immediately following the last I-frame identified in the received message. Processor 119 at step 809 retrieves the record associated with terminal 158-1. Processor 119 at step 812 notes in the record that the transmission of the program material and interactive application data to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material including any interactive application data starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 10:
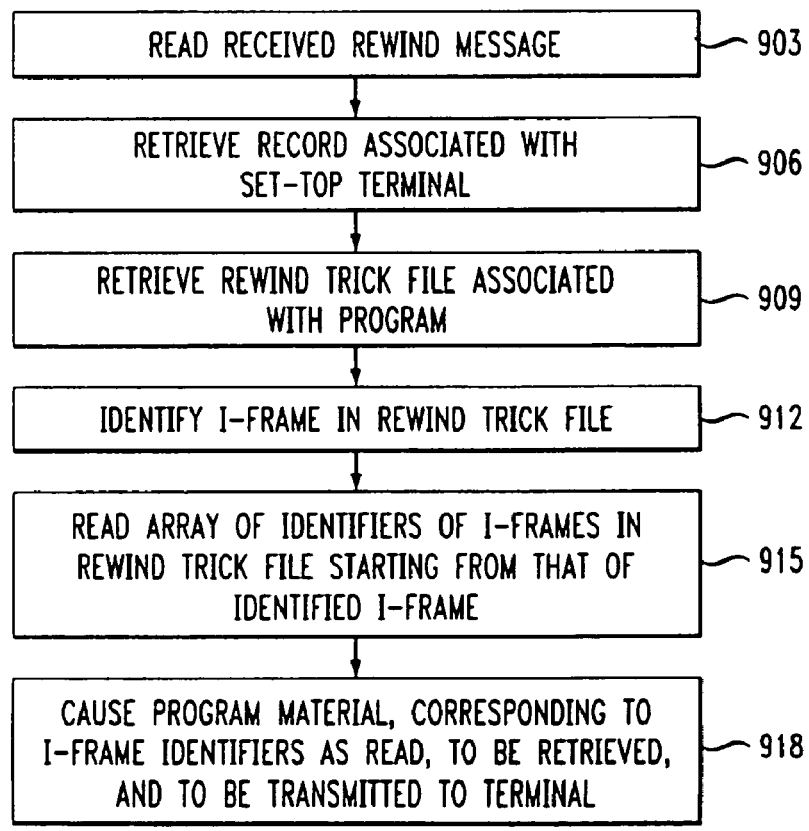
FIG. 10 is a flow chart depicting a process for rewinding a program in response to a rewind message from a set-top terminal.

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1. After receiving such a rewind message, processor 119 reads the received rewind message, as indicated at step 903 in FIG. 10. Processor 119 at step 906 retrieves the record associated with set-top terminal 158-1 identified by the received IP address (and/or MAC address). Knowing from the record the identity of the program being transmitted, processor 119 at step 909 retrieves from the aforementioned asset storage the rewind trick file associated with the program. Based on the last I-frame information in the received message, processor 119 at step 912 identifies the I-frame in the rewind trick file which either matches or is the closest to that last I-frame. Processor 119 at step 915 reads the array of identifiers of the I-frames in the rewind trick file starting from that of the identified I-frame. Processor 119 at step 918 causes the program material, corresponding to the I-frame identifiers as read, to be retrieved from cache manager 111, and to be transmitted to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material including any interactive application data at the normal forward speed from cache manager 111 starting from the I-frame identified by the last read identifier, and transmission of the retrieved program material to terminal 158-1. As a result, terminal 158-1 resumes receiving the program material at the normal forward speed.

Figure 11:
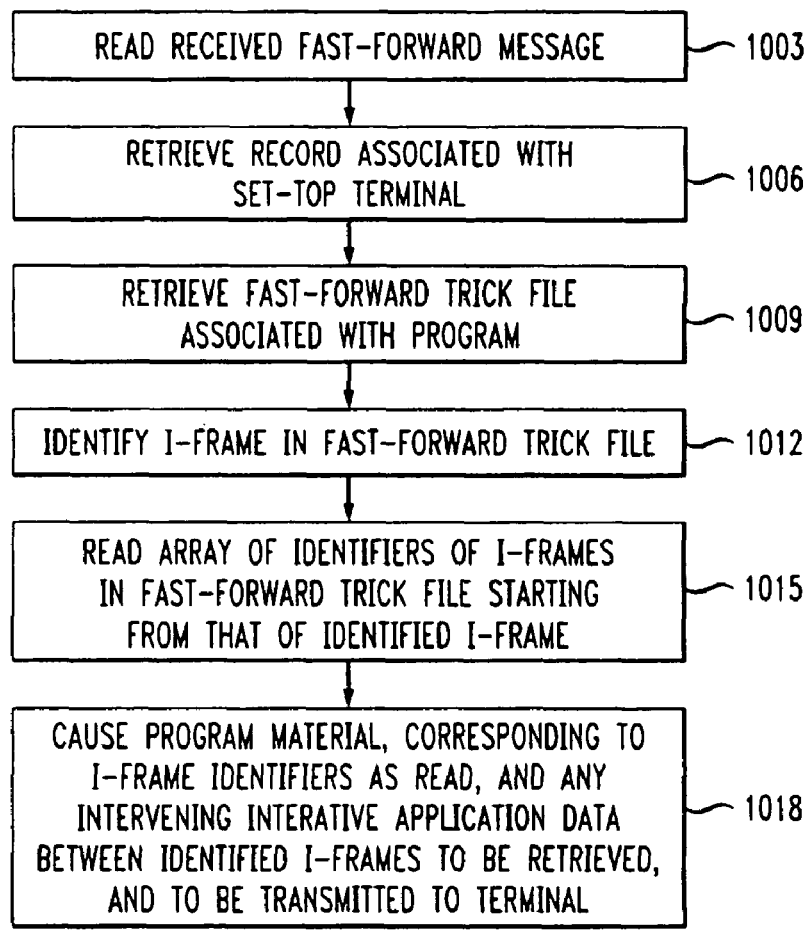
FIG. 11 is a flow chart depicting a process for fast-forwarding a program in response to a fast-forward message from a set-top terminal.

After rewinding a program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a fast-forward initiation command, the last I-frame identifier registered by terminal 158-1, and the IP address (and/or MAC address) identifying terminal 158-1. After receiving such a fast-forward message, processor 119 reads the received fast-forward message, as indicated at step 1003 in FIG. 11. Processor 119 at step 1006 retrieves the record associated with set-top terminal 158-1 identified by the received IP address (and/or MAC address). Knowing from the record the identity of the program being transmitted, processor 119 at step 1009 retrieves from the aforementioned asset storage the fast-forward trick file associated with the program. Based on the last I-frame information in the received message, processor 119 at step 1012 identifies the I-frame in the fast-forward trick file which either matches or is the closest to that last I-frame. Processor 119 at step 1015 reads the array of identifiers of the I-frames in the fast-forward trick file starting from that of the identified I-frame. Processor 119 at step 1018 causes the program material, corresponding to the I-frame identifiers as read, and any intervening interactive application data (enclosed by the aforementioned Data Start and Data End flags) between the identified I-frames to be retrieved from cache manager 111, and to be transmitted to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material including any interactive application data at the normal forward speed from cache manager 111 starting from the I-frame identified by the last read identifier, and transmission of the retrieved program material to terminal 158-1. As a result, terminal 158-1 resumes receiving the program material at the normal forward speed.

It should be pointed out at this juncture that in the above illustrative embodiment, the transport streams generated by processor 109 (with interactive application data, if any, inserted therein by processor 126), which contain, e.g., live TV broadcast, are recorded in cache manager 111, followed by library manager 113, before they are fed to the requesting set-top terminals. As a result, the transport streams received by the terminals actually are recorded copies of the streams generated by processor 109. However, in a second embodiment, the transport streams generated by processor 109 (with interactive application data, if any, inserted therein) are fed to the requesting set-top terminals in real time, and at the same time switched to cache manager 111 and library manager 113 for recording thereof. Thus, in this second embodiment, when a user at a set-top terminal performs a PVR-like function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced back by the real-time transport stream containing the in-progress program.

Based on the disclosure heretofore, it is apparent to a person skilled in the art that the above-described interactivities between a set-top terminal and media processor 119 and/or network controller 125 in serving a TV broadcast program similarly apply to serving of other types of asset, e.g., a music video, news event, weather report, traffic report, sports event, video-on-demand (VOD), an audio-on-demand, etc. For example, the VOD assets may be stored in the library storage in library manager 113.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, interactive application data shares the same transmission channel with programming content. It will be appreciated that a person skilled in the art may design a different scheme where the interaction application data is transmitted through a channel, e.g., an FDC, different than that of the programming content to a set-top terminal.

In addition, referring back to FIG. 2, in the disclosed embodiment the interactive application data associated with a program segment is transmitted as a burst (e.g., 210) ahead of the program segment (e.g., 231). However, if a user tunes in to TV program 201 at a point after program segment 231 starts, the user's set-top terminal begins to receive the corresponding program material from that point on, and is deprived of any associated interaction application data which is supposed to be transmitted before program segment 231 starts. In that case, any corresponding interactive feature(s) in program segment 231 would not be realized. A way to recapture the interactive application data is to rewind the program past the beginning of program segment 231 and data burst 210, followed by fast-forwarding back to the initial entry point of the program. Because of step 1018 in FIG. 11 described above, the set-top terminal would be provided with the interactive application data in burst 210 in the fast-forwarding. This rewind/fast-forward approach, however, causes inconvenience to the user.

Figure 12:
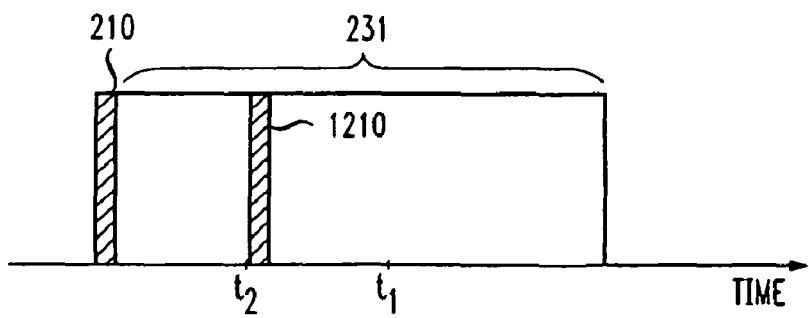
FIG. 12 is a timing diagram illustrating repeated transmissions of interactive application data before the corresponding interactive feature is presented.

FIG. 12 illustrates a more user-friendly approach where in addition to transmission of the interactive application in burst 210, the same interactive application data is repeatedly (e.g., periodically) transmitted to the set-top terminal (resulting, e.g., in burst 1210) before the corresponding interactive feature is actually presented in program segment 231 (e.g., at $t_1$), provided that the repeated burst 1210 be received by the set-top terminal at $t_2$ such that $t_1$-$t_2$ is greater than the time required for the set-top terminal to process the interactive application data in the burst and realize the corresponding interactive feature. Thus, with the approach depicted in FIG. 12, as long as the user tunes in to program segment 231 before $t_2$, as opposed to the beginning thereof, the user is afforded the corresponding interactive feature at $t_1$. For that matter, it may be desirable to do away with data burst 210 altogether and to rely on data burst 1210 for transmission of the interactive application data. It is also because such interactive application data transmission is afforded the full transmission channel bandwidth, and as a result the duration of burst 1210 is so short that any interruption of the program caused thereby would be virtually unnoticeable.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for providing an entertainment program over a transmission channel, comprising:
    a first processor for receiving a data stream which includes program data representing the entertainment program, said program data including at least two different program segments;
    a second processor for detecting a demarcation between different program segments in the received data stream and for determining whether the entertainment program has interactive application data associated with the detected demarcation which is to be inserted at a location in the data stream corresponding to the detected demarcation or if there is no interactive application data associated with the detected demarcation, no predetermined bandwidth of the transmission channel being required for transmission of the interactive application data; and
    a control unit for dynamically allocating bandwidth of the transmission channel for transmission of the interactive application data in response to determining that a detected demarcation has associated interactive application data, and for inserting the interactive application data into the data stream to be transmitted through the transmission channel.

2. The system of claim 1, wherein said interactive application data associated with the detected demarcation is processed to realize at least one interactive feature at a selected point of the entertainment program; and
    wherein the interactive application data contains a reference to a source from which data for realizing the at least one interactive feature is obtainable.

3. The system of claim 1 wherein the transmission of the interactive application data occurs before the transmission of the program data.

4. The system of claim 1 wherein the interactive application data is repeatedly transmitted through the transmission channel prior to the transmission of a portion of the program data corresponding to a part of the entertainment program where at least one interactive feature is presented.

5. The system of claim 4, further comprising:
    a device for receiving the interactive application data, wherein the length of the part of the entertainment program is a function of the time required by the device for realizing the at least one interactive feature based on received interactive application data.

6. The system of claim 5 wherein the device includes a set-top terminal.

7. The system of claim 4, wherein the at least one interactive feature is presented with a link to an activity associated therewith.

8. The system of claim 7 wherein the activity includes providing information relating to the entertainment program.

9. The system of claim 7 wherein the link includes an icon.

10. The system of claim 7 wherein the link includes a prompt.

11. The system of claim 1 wherein the data stream contains audio and video information.

12. The system of claim 1 wherein the data stream is encoded in an MPEG format.

13. The system of claim 1 wherein the transmission channel is made part of a cable TV network.

14. The system of claim 1 wherein the transmission of the interactive application data is afforded a full bandwidth of the transmission channel.

15. The system of claim 1, wherein said demarcation between different program segments is a demarcation which indicates the end of a commercial segment.

16. The system of claim 1, wherein said demarcation between different program segments is a demarcation which indicates the beginning of a commercial segment.

17. A method for providing an entertainment program over a transmission channel, comprising:
    operating a processor to receive a data stream which includes program data representing the entertainment program, the data stream being transmitted through the transmission channel;
    detecting a demarcation between different program segments in the program data representing the entertainment program;
    determining whether the entertainment program has interactive application data associated with the detected demarcation which is to be inserted at a location in the data stream corresponding to the detected demarcation or if there is no interactive application data associated with the detected demarcation, the interactive application data being data which is to be processed to realize at least one interactive feature at a selected point of the entertainment program, no predetermined bandwidth of the transmission channel being required for transmission of the interactive application data;
    dynamically allocating bandwidth of the transmission channel for transmission of the interactive application data in response to determining that a detected demarcation has associated interactive application data; and
    inserting the interactive application data into the data stream for transmission through the transmission channel.

18. The method of claim 17, wherein the interactive application data contains a reference to a source from which data for realizing the at least one interactive feature is obtainable.

19. The method of claim 17, wherein the transmission of the interactive application data occurs before the transmission of the data stream.

20. The method of claim 17, wherein the interactive application data is repeatedly transmitted through the transmission channel prior to the transmission of the data portion in the data stream.

21. The method of claim 17, further comprising:
    receiving the interactive application data, wherein the length of the part of the entertainment program is a function of the time required for processing the received interactive application data to realize the at least one interactive feature.

* * * * *